United States Patent
Sakakibara (10) Patent No.: US 6,552,489 B2
(45) Date of Patent: Apr. 22, 2003

(54) FLUORESCENT LAMP AND A METHOD OF MAKING SAME, AND A LIGHTING FIXTURE

(75) Inventor: Yuichi Sakakibara, Yokohama (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 0 days.

(21) Appl. No.: 09/793,123

(22) Filed: Feb. 27, 2001

(65) Prior Publication Data

US 2001/0036076 A1 Nov. 1, 2001

(30) Foreign Application Priority Data

Feb. 29, 2000 (JP) ........................................ 2000-054496

(51) Int. Cl.$^7$ ................................................ H01J 17/20
(52) U.S. Cl. ........................................ 313/636; 313/493
(58) Field of Search ................................. 313/636, 493

(56) References Cited

U.S. PATENT DOCUMENTS

| | | | | |
|---|---|---|---|---|
| 3,374,381 A | * | 3/1968 | Alinak et al. | 250/458.1 |
| 3,639,675 A | * | 2/1972 | Kaino | 174/50.56 |
| 3,723,790 A | * | 3/1973 | Dumbaugh et al. | 313/316 |
| 3,883,764 A | * | 5/1975 | Johnson et al. | 313/356 |
| 3,984,589 A | * | 10/1976 | van der Wolfe et al. | 427/106 |
| 4,377,404 A | * | 3/1983 | Hoshikawa et al. | 174/137 B |
| 5,177,395 A | * | 1/1993 | Reisman | 106/436 |
| 6,118,216 A | * | 9/2000 | Marlor | 313/25 |
| 6,284,686 B1 | * | 9/2001 | Marlor | 313/25 |

FOREIGN PATENT DOCUMENTS

| | | |
|---|---|---|
| JP | 6-92677 | 4/1994 |
| JP | 10-324540 | 12/1998 |

* cited by examiner

Primary Examiner—Sandra O'Shea
Assistant Examiner—Ismael Negron
(74) Attorney, Agent, or Firm—Pillsbury Winthrop LLP (57) ABSTRACT

A fluorescent lamp comprises a light-transmitting glass tube having a softening temperature of about 685 degrees centigrade or less, which is formed into a predetermined shape from a straight glass tube heated after a phosphor layer has been coated on its inner surface. The light-transmitting glass tube does not substantially include lead (Pb) but may include: about 2 to about 5 weight % calcium oxide (CaO), and about 1 to about 3 weight % magnesium oxide (MgO). A stem, having an electrode, is arranged at each end of the light-transmitting glass tube. The fluorescent lamp may be used in a lighting fixture.

10 Claims, 3 Drawing Sheets

FLUORESCENT LAMP AND A METHOD OF MAKING SAME, AND A LIGHTING FIXTURE

RELATED APPLICATIONS

This application claims the benefit of Japanese patent application number 2000-054496, filed Feb. 29, 2000, the contents of which are incorporated herein by reference.

BACKGROUND OF THE INVENTION

1. Field of Invention

The present invention relates to a fluorescent lamp having a light-transmitting glass tube, which does not substantially contain lead (Pb).

2. Description of Related Art

To save our environment, demand has increased for a fluorescent lamp having a glass tube which substantially does not contain lead (Pb). The glass tube is made of a soda-lime glass, for example, having sodium oxide ($Na_2O$) of 15 to 17 weight %, and a softening temperature of about 690 degrees centigrade. A circular fluorescent lamp having the soda-lime glass tube may be manufactured, for example, as follows:

(1) coating a luminescent compound solution on the inner surface of a straight glass tube, (2) baking the coated layer on the straight glass tube at a predetermined temperature to form a phosphor layer, (3) sealing each end of the glass tube with a stem having an electrode, (4) forming the straight glass tube into a circular glass tube by bending the straight glass around a drum while heating the straight glass tube at a softening temperature of the glass or more, (5) exhausting the circular glass tube via an exhaust tube and introducing rare gas and mercury (Hg) into the circular glass tube, and (6) sealing the exhaust tube.

In this case, the efficiency of the phosphor layer is reduced as a result of the heat of the above-mentioned forming process (4), so that the total luminous flux tends to drop, since the chemical characteristics of the phosphor are changeable at the temperature of the forming process (4).

The mercury (Hg) in the glass tube slightly migrates into the glass tube during the lamp operation, so that the sodium (Na) of the glass tube reacts with the mercury (Hg). As a result, the glass tube slightly blackens, so that the luminous flux decreases.

The sodium (Na) occasionally migrates to the inner surface of the glass tube because of the heat of the forming process, so that sodium (Na) reacts with mercury (Hg) and makes a mercury compound on the inner surface of the glass tube. As a result, the mercury compound reduces the luminous flux, because the mercury compound absorbs visible light generated by the discharge of the fluorescent lamp. Furthermore, the sodium (Na), migrating to the inner surface of the glass tube, migrates into the phosphor layer, and causes the phosphor to become slightly brown. It is known that the amount of coloring caused by sodium (Na) is proportional to the amount of heat supplied to the straight glass tube in order to form it. As the heat is increased, sodium (Na) migrates more to the inner surface of the glass tube and migrates into the phosphor layer more.

Also, when mercury (Hg) reacts with sodium (Na), the quantity of mercury (Hg) in the glass tube decreases. As a result, the fluorescent lamp occasionally can not maintain stable discharge because of a lack of mercury (Hg). Therefore, generally, such fluorescent lamp contains an excessive quantity of mercury (Hg), e.g., a total amount of about 10 mg or more, or about 0.02 to about 0.03 $mg/cm^3$ or more.

Furthermore, Japanese Laid Open Patent Application HEI 10-324540 discloses a glass composition not containing lead (Pb), for use in a stem. A part of a pair of conductive wires are embedded in the stem. Such glass composition is used mainly because the thermal expansion coefficient of the glass is similar to that of the conductive wires. However, such stem glass composition is not used for the glass tube. That is, it is not disclosed that the glass composition should be selected so that it is easily formed into a predetermined shaped tube, e.g., a circular tube or U-shaped tube, and so that reduction of luminous flux is reduced during manufacturing or over the life of the lamp. Moreover, it is not disclosed that the sodium (Na), which migrates to the inner surface of the glass tube by the heat, reacts with mercury (Hg), or migrates to the phosphor layer.

SUMMARY OF THE INVENTION

According to one aspect of the invention, a fluorescent lamp comprises a light-transmitting glass tube having a softening temperature of about 685 degrees centigrade or less. The light-transmitting glass tube does not substantially include lead (Pb), and does include: about 1 to about 11 weight % sodium oxide ($Na_2O$), about 1 to about 10 weight % potassium oxide ($K_2O$), 0 to about 3 weight % lithium oxide ($Li_2O$), wherein the total amount of sodium oxide ($Na_2O$), potassium oxide ($K_2O$), and lithium oxide ($Li_2O$) is about 5 to about 20 weight %, and about 0.1 to about 0.5 weight % antimony oxide ($Sb_2O_3$). A stem, having an electrode, is arranged at each end of the light-transmitting glass tube.

According to another aspect of the invention, a method for manufacturing a fluorescent lamp comprises:

coating a luminescent compound on the inner surface of a straight glass tube;

wherein the straight glass tube has a softening temperature of about 685 degrees centigrade or less, does not substantially include lead (Pb), and includes:

sodium oxide ($Na_2O$) about 1 to about 11 weight %, potassium oxide ($K_2O$) about 1 to about 10 weight %, lithium oxide ($Li_2O$) 0 to about 3 weight %, wherein the total amount of sodium oxide ($Na_2O$), potassium oxide ($K_2O$), and lithium oxide ($Li_2O$) is about 5 to about 20 weight %, and antimony oxide ($Sb_2O_3$) about 0.1 to about 0.5 weight %;

baking the coated layer on the straight glass tube at a predetermined temperature to form a phosphor layer;

sealing each end of the glass tube with a stem having an electrode;

bending the straight glass while heating the straight glass tube at the softening temperature of the glass or more;

exhausting the glass tube via an exhaust tube and introducing rare gas and mercury (Hg) into the glass tube; and sealing the exhaust tube.

According to another aspect of the invention, a lighting fixture comprises the fluorescent lamp. A body holds the fluorescent lamp. A ballast is arranged on the body for supplying the electric power to the fluorescent lamp.

These and other aspects of the invention are further described in the following drawings and detailed description of the invention.

BRIEF DESCRIPTION OF THE DRAWINGS

The invention will be described below in more details by way of examples illustrated by drawings in which.

DETAILED DESCRIPTION OF THE EMBODIMENTS

Figure 1:
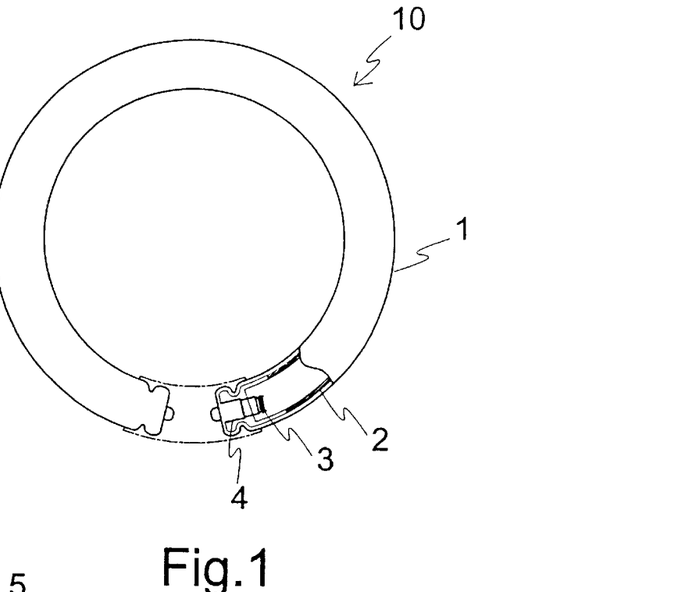
FIG. 1 is a front view, partly in longitudinal section, of a circular fluorescent lamp according to a first embodiment of the present invention.

A first embodiment of the invention will be described in detail with reference to FIG. 1.

A fluorescent lamp 10 is provided with a predetermined shaped tube, e.g., a single circular glass tube 1 having an outer tube diameter of about 29.5 mm, a thickness of about 1.2 mm, and a tube length of about 590 mm. A phosphor layer 2 is coated on the inner surface of the glass tube 1. Each of stems 4 holding an electrode 3 air-tightly seals an end of the glass tube 1. The glass tube 1 is filled with a filling gas comprising rare gas, e.g., argon (Ar) and mercury (Hg).

The phosphor layer 2 comprises conventional luminescent compounds, which generate a three-peak emission including a blue wavelength of about 430 nm to about 460 nm, a green wavelength of about 540 nm to about 550 nm, and a red wavelength of about 610 nm to about 620 nm. The conventional luminescent compounds comprise a blue or blue-green emission luminescent compound, e.g., aluminate activated by europium indicated as $Eu^{2+}$, aluminate activated by both europium indicated as $Eu^{2+}$ and manganese (Mn), or phosphate activated by europium indicated as $Eu^{2+}$, a red emission luminescent compound, e.g., yttrium oxide activated by europium indicated as $Eu^{3+}$, or yttrium sulfide activated by europium indicated as $Eu^{3+}$, and a green emission luminescent compound, e.g., rare earth elements. The phosphor layer 2, which includes the luminescent compounds, also does not have a characteristic of absorbing mercury (Hg) easily, so that the mercury (Hg) in the glass tube is not reduced. Accordingly, the fluorescent lamp can maintain stable discharge in the glass tube during the life of the lamp.

A method for manufacturing the predetermined shape of the circular glass tube having the phosphor layer 2, is as follows:

(1) coating a luminescent compound solution on the inner surface of a straight glass tube (not shown), (2) baking the coated layer on the straight glass tube at a temperature in the range of about 500 to about 650 degrees centigrade, (3) sealing the ends of the straight glass tube with stems holding the electrodes 3, (4) forming a circular glass tube 1 from the straight glass tube by bending the straight glass tube around a drum (not shown) with the straight glass tube being heated to the softening temperature of the glass or more than about 700 to about 750 degrees centigrade, (5) exhausting the circular glass tube 1 via an exhaust tube (not shown) at a temperature in the range of about 300 to about 500 degrees centigrade, with the heat of the forming process remaining, and introducing rare gas and mercury (Hg) into the circular glass tube 1, and (6) sealing the exhaust tube and cutting it off.

Generally, in the exhausting and introducing process, the circular glass tube 1 is still heated in order to easily exhaust and introduce the gas. However, during exhausting and introducing, sodium (Na) does not easily migrate to the inner surface of the circular tube 1 because the tube is not heated further. Furthermore, in the forming process, since the straight glass tube is not intensively heated and the straight tube is also formed into the predetermined shape at one time, the straight glass tube does not receive excessive heat, so that sodium (Na) does not significantly migrate to the inner surface of the glass tube 1.

The glass tube has a softening temperature of about 685 degrees centigrade or less, and does not substantially include lead (Pb). The composition of the glass (hereunder the alkali glass) includes:

sodium oxide ($Na_2O$) about 1 to about 11 weight %, potassium oxide ($K_2O$) about 1 to about 10 weight %, lithium oxide ($Li_2O$) 0 to about 3 weight %, wherein the total amount of sodium oxide ($Na_2O$), potassium oxide ($K_2O$), and lithium oxide ($Li_2O$) is about 5 to about 20 weight %, and antimony oxide ($Sb_2O_3$) about 0.1 to about 0.5 weight %.

The mixture of sodium oxide ($Na_2O$), potassium oxide ($K_2O$), and lithium oxide ($Li_2O$) can reduce the softening temperature to about 685 degrees centigrade or less. Therefore, the straight glass tube can be formed into the circular glass tube at a low baking temperature. Accordingly, the efficiency of the phosphor layer does not drop as a result of the heat of baking, so that the circular fluorescent lamp maintain its total luminous flux. Since the glass contains sodium oxide ($Na_2O$) of about 11 weight % or less, the coloring caused by the reaction of sodium (Na) and mercury (Hg) can be prevented from spreading on the inner surface of the glass tube. Therefore, the luminous flux is maintained during operation.

An alkali glass having a low softening temperature of about 650 to about 685 degrees centigrade may include:

silicon oxide ($SiO_2$) about 60 to about 75 weight % aluminum oxide ($Al_2O_3$) about 1 to about 5 weight % sodium oxide ($Na_2O$) about 1 to about 11 weight %, potassium oxide ($K_2O$) about 1 to about 10 weight %, lithium oxide ($Li_2O$) 0 to about 3 weight %, wherein the total amount of sodium oxide ($Na_2O$), potassium oxide ($K_2O$), and lithium oxide ($Li_2O$) is about 5 to about 20 weight calcium oxide (CaO) 0 to about 3 weight %, magnesium oxide (MgO) 0 to about 2 weight %, barium oxide (BaO) about 1 to about 10 weight %, strontium oxide (SrO) about 0.5 to about 10 weight %, wherein the total amount of calcium oxide (CaO), magnesium oxide (MgO), barium oxide (BaO), and strontium oxide (SrO) is about 4.5 to about 16 weight %, boron oxide ($B_2O_3$) 0 to about 3 weight %, zinc oxide (ZnO) 0 to about 3 weight %, and antimony oxide ($Sb_2O_3$) about 0.1 to about 0.5 weight %.

The silicon oxide ($SiO_2$) is mainly utilized to form a network structure. When the quantity of silicon oxide ($SiO_2$) is less than about 60 weight %, the chemical endurance of the glass is reduced. When the quantity of silicon oxide ($SiO_2$) is more than about 75 weight %, the glass does not easily soften and melt in heat.

The aluminum oxide ($Al_2O_3$) can increase chemical endurance and homogenize the glass. When aluminum oxide ($Al_2O_3$) is less than about 1 weight %, it is difficult to form the glass structure. This low amount of aluminum oxide ($Al_2O_3$) can not sufficiently homogenize the glass, so that glass phase separation occurs. However, when aluminum oxide ($Al_2O_3$) is more than about 5 weight %, the glass cannot easily homogenize. Since aluminum oxide ($Al_2O_3$) cannot melt with the other compositions, the aluminum oxide ($Al_2O_3$) appears as white lines after making the straight glass tube.

The sodium oxide ($Na_2O$), the potassium oxide ($K_2O$), and the lithium oxide ($Li_2O$) act as a flux, which dissolves the other materials. The flux melts the glass, and reduces the softening temperature of the glass. One example of this flux mixes a small amount of sodium oxide ($Na_2O$), and a large total amount of potassium oxide ($K_2O$) and lithium oxide ($Li_2O$), wherein the total amount of sodium oxide ($Na_2O$), potassium oxide ($K_2O$), and lithium oxide ($Li_2O$) is about 5 to about 20 weight %. When the total amount of sodium oxide ($Na_2O$), potassium oxide ($K_2O$), and lithium oxide ($Li_2O$) is less than about 5 weight %, it is difficult for the glass to melt. The softening temperature also tends to rise. Accordingly, the glass tube is made so as to have a softening temperature of about 685 degrees centigrade or less. In this case, the amount of potassium oxide ($K_2O$) and lithium oxide ($Li_2O$) total about 4 weight % or more.

Furthermore, the amount of sodium oxide ($Na_2O$), potassium oxide ($K_2O$) and lithium oxide ($Li_2O$) can control the thermal expansion coefficient of the glass. The total amount of sodium oxide ($Na_2O$), potassium oxide ($K_2O$) and lithium oxide ($Li_2O$) may be about 20 weight % or less. When the total amount of sodium oxide ($Na_2O$), potassium oxide ($K_2O$) and lithium oxide ($Li_2O$) is more than about 20 weight %, the thermal expansion coefficient of the glass becomes too high, and the chemical endurance of the glass is reduced. When the amount of sodium oxide ($Na_2O$) is more than about 11 weight %, the softening temperature and the thermal expansion coefficient of the glass become too high. When the amount of potassium oxide ($K_2O$) or lithium oxide ($Li_2O$) exceeds the upper limit, the thermal expansion coefficient of the glass also becomes too high.

The total amount of sodium oxide ($Na_2O$), potassium oxide ($K_2O$) and lithium oxide ($Li_2O$) may be about 12 to about 19 weight %. The quantity of sodium oxide ($Na_2O$) may be about 6 to about 10 weight %. The quantity of potassium oxide ($K_2O$) may be about 5 to about 9 weight %. The quantity of lithium oxide ($Li_2O$) may be about 1 to about 2 weight %. Accordingly, the softening temperature of the glass can be reduced.

Barium oxide (BaO) can control the electrical conductance of the glass. When the amount of barium oxide (BaO) is less than about 1 weight %, the glass is not insulating enough. However, when the quantity of barium oxide (BaO) is more than about 10 weight %, materials of a melting furnace occasionally contaminate the glass, and impurities increase in the glass.

Strontium oxide (SrO) also can control the electrical conductance of the glass. When the amount of strontium oxide (SrO) is less than about 0.5 weight %, the glass is not insulating enough. When the amount of strontium oxide (SrO) is more than about 10 weight %, the transparency of the glass is decreased. The quantity of strontium oxide (SrO) may be about 8 weight % or less.

The durability of the glass is enhanced with calcium oxide (CaO), and magnesium oxide (MgO). When calcium oxide (CaO) or magnesium oxide (MgO) exceeds the upper limit, the transparency of the glass starts to decrease. When the total amount of calcium oxide (CaO), magnesium oxide (MgO), barium oxide (BaO) and strontium oxide (SrO) is about 4.5 to about 16 weight %, the electrical conductance of the glass increases. When the total amount is less than about 4.5 weight %, the glass becomes too electrically conductive. However, when the total amount is more than about 16 weight %, the glass starts to crystallize.

Boron oxide ($B_2O_3$) causes the glass to melt more easily. However, when the quantity of boron oxide ($B_2O_3$) is more than about 3 weight %, the chemical endurance of the glass is reduced. That is, some materials contained in the glass occasionally migrate to a surface of the glass tube after the lamp has operated for a long time. As a result, the transparency of the glass is reduced.

Zinc oxide (ZnO) can prevent boron oxide ($B_2O_3$) or alkali volatilizing while the glass is melting. When the amount of zinc oxide (ZnO) is more than about 3 weight %, devitrification tends to occur.

Antimony oxide ($Sb_2O_3$) helps to melt the glass, before making the straight glass tube. Antimony oxide ($Sb_2O_3$) can remove bubbles from melted glass. If the quantity of antimony oxide ($Sb_2O_3$) is less than about 0.1 weight %, the bubbles are not sufficiently removed. When the amount of antimony oxide ($Sb_2O_3$) is more than about 0.5 weight %, the lumenance of the lamp decreases too much during operation.

The alkali glass may further comprise iron oxide ($Fe_2O_3$) in order to control the transmittance of the glass tube. The amount of iron oxide ($Fe_2O_3$) may be in the range of about 0.01 to about 0.05 weight %. When the amount of the iron oxide ($Fe_2O_3$) is less than about 0.01 weight %, the cost of the glass tube becomes high. When the amount of the iron oxide ($Fe_2O_3$) is more than about 0.05 weight %, the transmittance of the glass tube starts to decrease.

Accordingly, since the circular glass tube 1 is made of the above-mentioned alkali glass, the glass tube 1 is improved as follows:

(1) The efficiency of the phosphor layer does not drop as much when the tube is baked.

(2) Coloring caused by the reaction of sodium (Na) and mercury (Hg) does not spreading as much on the glass tube.

(3) It is easy to control the thermal expansion coefficient and the electrical conductance of the glass.

As a result, the quality of the fluorescent lamp improves.

The alkali glass is also suitable for the stems 4. When the circular glass tube 1 and the stem 4 are made of the same glass, it is easy to recycle the glass. The glass may be useful for glass tubes having a variety of shapes, which are formed by heat after coating the phosphor layer.

A more detailed example of the straight glass tube will be explained hereunder.

EXAMPLE 1

The straight glass tube, which is formed from glass melted by the aforementioned method, has an outer diameter of about 29.5 mm, a length of about 590 mm, a thickness of about 1.2 mm, and a softening temperature of about 580 degrees centigrade. The glass composition is as follows:

silicon oxide ($SiO_2$) about 72.0 weight %,
aluminum oxide ($Al_2O_3$) about 3.5 weight %,
sodium oxide ($Na_2O$) about 8.0 weight %,
potassium oxide ($K_2O$) about 3.0 weight %,
lithium oxide ($Li_2O$) about 2.0 weight %, calcium oxide (CaO) about 1.0 weight %,
barium oxide (BaO) about 6.0 weight %,
strontium oxide (SrO) about 1.0 weight %,
boron oxide ($B_2O_3$) about 2.0 weight %,
zinc oxide (ZnO) about 1.3 weight %, and
antimony oxide ($Sb_2O_3$) about 0.2 weight %.

The method for manufacturing the circular fluorescent lamp of the FCL30/28 type (Japanese Industrial Standard (hereunder JIS)) is as follows:

(1) coating the luminescent compound solution, which generates three-peak emission including a blue wavelength of about 430 nm to about 460 nm, a green wavelength of about 540 nm to about 550 nm, and a red wavelength of about 610 nm to about 620 nm, on the inner surface of the straight glass tube, (2) baking the coated phosphor layer having color temperature of 6700K with the straight glass tube at a temperature of about 500 to about 650 degrees centigrade, (3) sealing stems made of the same glass as the straight glass tube to the ends of the straight glass tube, (4) forming the straight glass tube into the circular glass tube by winding the straight glass tube on a drum (not shown) while heating the straight glass tube at a temperature of about 750 degrees centigrade, and (5) filling the circular glass tube with argon (Ar) gas and mercury (Hg).

In contrast, the comparative sample 1 of the conventional lamp is composed of a conventional soda-lime glass tube having sodium oxide ($Na_2O$) of 16 weight %, and a softening temperature of 690 degrees centigrade. The conventional glass tube is formed into the circular glass tube by winding the straight glass tube on to a drum while heating the tube at the temperature of about 770 degrees centigrade. The lamp dimensions of the comparative sample 1 are substantially the same the lamp of the Example 1. Accordingly, the total luminous flux of the Example 1 improved 2% in comparison with the comparative sample 1. Moreover, the luminous flux maintenance factor of the Example 1 was 91%, as compared with 88% of the comparative sample 1, after the lamp operated 2000 hours. That is, the luminous flux maintenance factor of the Example 1 improved 3.4% in comparison with the comparative sample 1, after the lamp operated 2000 hours.

EXAMPLE 2

The straight glass tube has a softening temperature of about 575 degrees centigrade. The straight glass tube dimensions are the same as in Example 1 and its composition is as follows:

silicon oxide ($SiO_2$) about 70.4 weight %,
aluminum oxide ($Al_2O_3$) about 1.9 weight %,
sodium oxide ($Na_2O$) about 6.4 weight %,
potassium oxide ($K_2O$) about 8.1 weight %,
lithium oxide ($Li_2O$) about 1.4 weight %,
calcium oxide (CaO) about 1.9 weight %,
magnesium oxide (MgO) about 1.0 weight %,
barium oxide (BaO) about 1.5 weight %,
strontium oxide (SrO) about 5.4 weight %,
boron oxide ($B_2O_3$) about 1.9 weight %, and
antimony oxide ($Sb_2O_3$) about 0.1 weight %.

The method for manufacturing the fluorescent lamp of the FCL30/28 type (JIS) is the same with Example 1, except for using a phosphor layer having a color temperature of the 5000K and forming the straight glass tube at a temperature of about 740 degrees centigrade. As a result, the total luminous flux of Example 2 improved 1.5% in comparison with the comparative sample 1. Moreover, the luminous flux maintenance factor of Example 2 also improved 3.5% in comparison with the comparative sample 1, after the lamp operated 2000 hours.

EXAMPLE 3

The straight glass tube has the softening temperature of about 680 degrees centigrade and further includes iron oxide ($Fe_2O_3$). The straight glass tube dimensions are the same as in Example 1 and its composition is as follows:

silicon oxide ($SiO_2$) about 68.7 weight %,
aluminum oxide ($Al_2O_3$) about 1.8 weight %,
sodium oxide ($Na_2O$) about 7.8 weight %,
potassium oxide ($K_2O$) about 4.7 weight %,
lithium oxide ($Li_2O$) about 1.5 weight %,
calcium oxide (CaO) about 3.8 weight %,
magnesium oxide (MgO) about 2.2 weight %,
barium oxide (BaO) about 3.0 weight %,
strontium oxide (SrO) about 5.6 weight %,
boron oxide ($B_2O_3$) about 0.3 weight %,
antimony oxide ($Sb_2O_3$) about 0.4 weight %, and
iron oxide ($Fe_2O_3$) about 0.03 weight %.

The method for manufacturing the fluorescent lamp of the FCL30/28 type (JIS) is as follows:

(1) coating about 2.0 mg of the luminescent compound, which includes a blue emission luminescent compound of aluminate barium (Ba) magnesium (Mg) activated by europium indicated as $Eu^{2+}$, a green emission luminescent compound of phosphate lanthanum (La) activated by cerium (Ce) and terbium (Tb), and a red emission luminescent compound of yttrium oxide activated by europium indicated as $Eu^{3+}$, on the inner surface of the straight glass tube, (2) baking the coated phosphor layer with the straight glass tube at a temperature of about 500 to about 650 degrees centigrade, (3) sealing end of the tube with a stem made of the same glass as the tube, (4) forming the tube into a circular shape by winding the straight glass tube on to a drum (not shown) while heating the straight glass tube at a temperature of about 680 degrees centigrade, and (5) filling the tube with argon (Ar) gas at a pressure of about 320 Pa and an alloy including zinc (Zn) and about 4 mg of mercury (Hg).

In this case, iron oxide ($Fe_2O_3$) controls the transmittance of the glass tube, so that the transmittance does not decrease during lamp operation.

Figure 2:
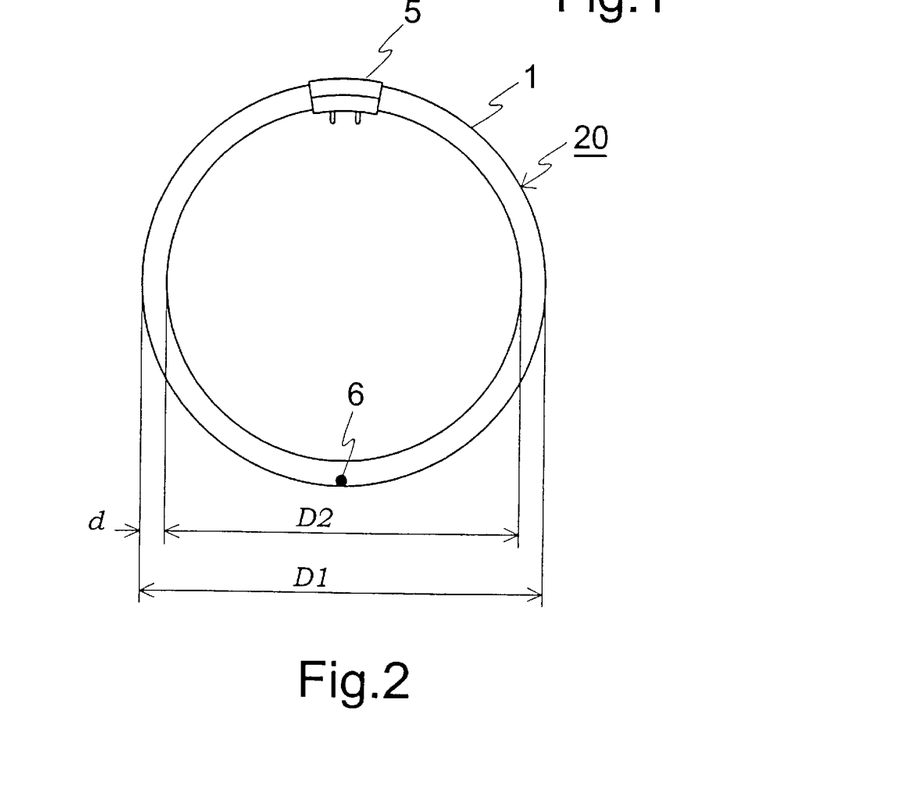
FIG. 2 is a front view of a circular fluorescent lamp according to a second embodiment of the present invention.

A second embodiment of the invention will be explained in detail with reference to FIG. 2. A fluorescent lamp 20 comprises a glass tube 1 using the same glass as the first embodiment. A method for manufacturing the fluorescent lamp is the same as the first embodiment.

However, the outer diameter of the glass tube 1 is smaller than that of the first embodiment. The glass tube 1 is filled with an ionizable gas filling containing a rare gas, e.g., argon (Ar) and mercury (Hg). A phosphor layer (not shown) is formed on the inner surface of the glass tube 1. An electrode (not shown) is arranged at the each end of the glass tube 1. A lamp base 5 is arranged between the opposite ends of the glass tube 1. A high frequency power of 10 KHz or more is supplied to the fluorescent lamp 20.

The glass tube 1 has a circular outer diameter (D1) of about 299 mm (or about 285 mm to about 310 mm), a circular inner diameter (D2) of about 266 mm, a tube outer diameter (d) of about 16.5 mm (or about 15 mm to about 18 mm), and a thickness of about 1.0 mm (or about 0.8 mm to about 1.2 mm). The fluorescent lamp 20 has a rated lamp power of about 27 W or about 38 W that supplies very high frequency voltage to the lamp (hereinafter the FHC27 type lamp). The FHC27 type lamp has the same circular outer diameter as the conventional 30 W circular fluorescent lamp.

Another aspect of glass tube 1 has a circular outer diameter (D1) of about 373 mm (or about 365 mm to about 390 mm), a circular inner diameter (D2) of about 340 mm, a tube outer diameter (d) of about 16.5 mm (or about 15 mm to about 18 mm), and a thickness of about 1.0 mm (or about 0.8 mm to about 1.2 mm). The fluorescent lamp 20 has a rated lamp power of about 34 W or about 48 W that supplies very high frequency voltage to the lamp (hereinafter the FHC34 type lamp). The FHC34 type lamp has the same circular outer diameter as the conventional 40 W circular fluorescent lamp. The invention may have any dimensions, e.g., the circular outer diameter, the tube diameter, or the thickness.

The phosphor layer comprises conventional luminescent compounds, which generate a three-peak emission including a blue wavelength of about 430 nm to about 460 nm, a green wavelength of about 535 nm to about 550 nm, and a red wavelength of about 605 nm to about 620 nm. The correlated color temperature is 5000K, for example.

The fluorescent lamp may comprise a pellet 6 containing about 6 mg of mercury (Hg), which has a diameter of about 0.5 mm to about 3 mm made of alloy including zinc (Zn) and mercury (Hg). The pellet can accurately provide the appropriate quantity of mercury (Hg) in the glass tube.

The FHC27 type circular fluorescent lamp has a cross-sectional area of about 1.65 cm$^2$. The maximum current inputted to the fluorescent lamp is about 380 mA during the lamp operation. Therefore, the lamp current density is about 230 mA/cm$^2$. The luminous flux maintenance factor of the lamp improves 10% after 9000 hours of lamp operation as compared with a comparative lamp having the conventional soda-lime glass tube containing 15 to 16 weight % sodium oxide (Na$_2$O).

In the above-mentioned comparative sample 1, when the lamp current density is about 200 mA/cm$^2$ or more, mercury (Hg) tends to migrate to the glass tube through cracks in the phosphor layer, so that the sodium (Na) of the glass tube reacts with the mercury (Hg). The cracks are likely to occur when the straight glass tube having the phosphor layer is bent. As a result, the glass tube slightly changes to a blackish color, so that the luminous flux maintenance factor decreases. Moreover, when the lamp current density is about 200 mA/cm$^2$ or higher, more ultraviolet rays of 185 nm tend to be generated. Therefore, the ultraviolet rays can increasingly be changed into visible light. However, the ultraviolet rays make sodium (Na) migrate more to the inner surface of the glass tube, so that the mercury (Hg) in the glass tube reacts with the sodium (Na) and decreases the luminous flux maintenance factor. In this embodiment, even if the lamp current density is about 200 mA/cm$^2$ or more, the luminous flux maintenance factor does not decrease, because the cracks in the phosphor layer do not occur easily.

A third embodiment of the invention will be explained in detail with reference to FIG. 3. A fluorescent lamp has plural light-transmitting glass tubes, e.g., double-circular glass tubes. The method for forming each circular glass tube is similar to the forming process of the first embodiment. However, in this embodiment, after each glass tubes is made, the circular tubes are intensively heated at a selected point in order to join the circular tubes via a bridge glass tube.

In this case, sodium (Na) may slightly migrate to the inner surface of the glass tubes, or around the bridge glass portion. Therefore, the amount of mercury (Hg) in the glass tubes should be reduced, so that the mercury (Hg) does not react with the sodium (Na) which has been migrated.

Figure 3:
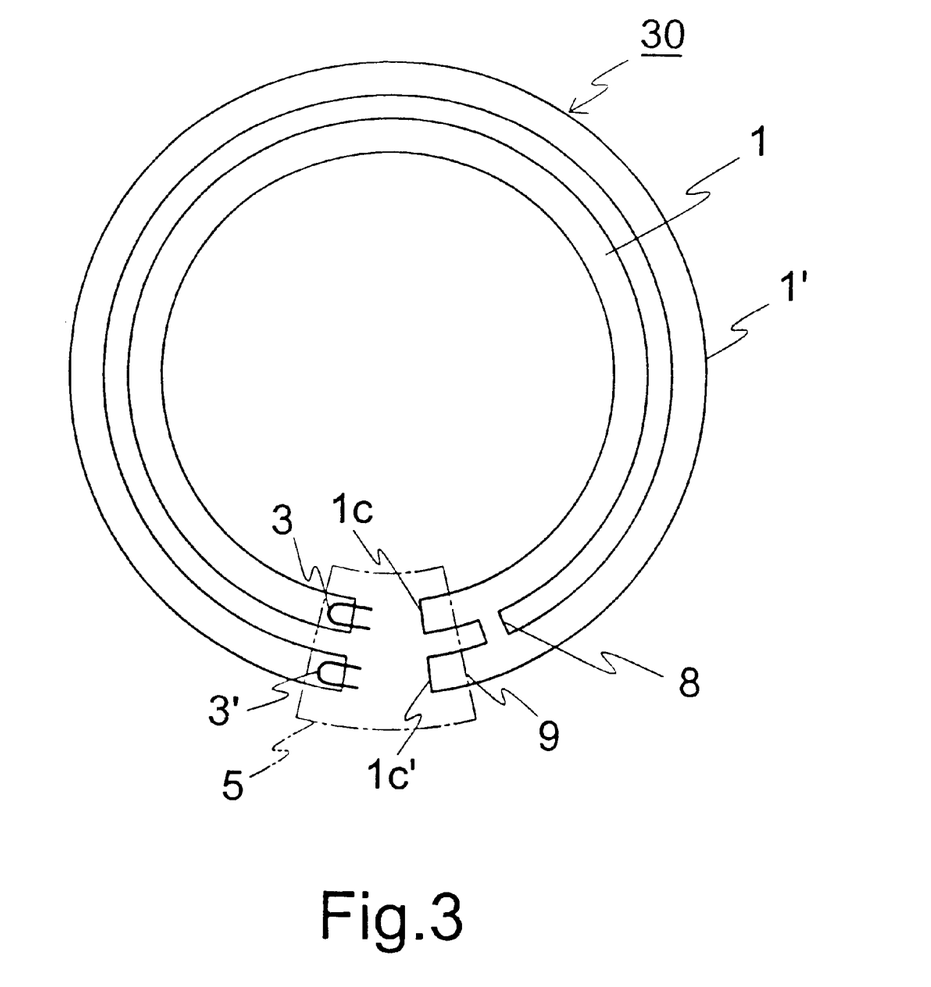
FIG. 3 is a front view of a double-circular fluorescent lamp according to a third embodiment of the present invention.

A double-circular fluorescent lamp 30 shown in FIG. 3 comprises first and second glass tubes 1, 1' using the same glass as the first embodiment. The first and second glass tubes 1, 1' are arranged on the same plane as shown in FIG. 3 and are connected 8. Each of the glass tubes 1, 1', has an outer diameter of about 20 mm, which is smaller than that of the first embodiment, and a thickness of about 1.2 mm. The first and second glass tubes 1, 1' respectively have circular outer diameters of about 355 mm and about 400 mm. Each of the first and second electrodes 3, 3' are arranged in one end of each of the glass tubes 1, 1', respectively. The bridge glass tube 8 is formed about 15 mm to about 30 mm from the other ends 1c, 1c' of the glass tubes 1, 1'. Accordingly, the double-circular fluorescent lamp can discharge from the electrode 3 of the glass tube 1 to the other electrode 3' of the glass tube 1' in the fluorescent lamp is formed around an area 9 between the bridge glass tube 8 and the other ends 1c, 1c' of the glass tubes 1, 1'. Area 9 is not in the discharge path. A lamp base 5 is arranged between the opposite ends of the glass tubes 1, 1' so as not to cover the bridge glass tube 8. A phosphor layer is formed on the inner surface of the glass tubes 1, 1'. A high frequency power of 10 KHz or more is supplied to the fluorescent lamp 30. The glass tubes 1, 1' are filled with an ionizable gas filling containing a rare gas, e.g., argon (Ar) and mercury (Hg).

The circular fluorescent lamp may comprise a pellet (not shown) containing about 6 mg of mercury (Hg) as in the second embodiment, having a diameter of about 0.5 mm to about 3 mm. The pellet is made of an alloy including zinc (Zn) and mercury (Hg). The pellet can accurately provide the appropriate quantity of mercury (Hg) in the glass tube. The pellet may be fixed on the inner surface of the cold spot area 9 by melting one end of the glass tube 1, 1'.

The double-circular fluorescent lamp 30, which is called the FHD1100 type lamp, has a lamp power of about 97 W, a volume of about 550 cm$^3$, and about 6 mm of mercury (Hg) or about 0.0109 mg/cm$^3$. In this case, the fluorescent lamp maintained a stable discharge with sufficient mercury (Hg) after 9000 hours of lamp operation (the rated lamp life).

When the amount of mercury (Hg) is less than about 0.003 mg/cm$^3$, the fluorescent lamp starts to darken during the rated lamp life because of a reduction of mercury (Hg). When the amount of mercury (Hg) is more than about 0.016 mg/cm$^3$, excess mercury (Hg) reacts with the sodium (Na) that has slightly migrated to the surface of the tube by the heat of the joining process.

Figure 4:
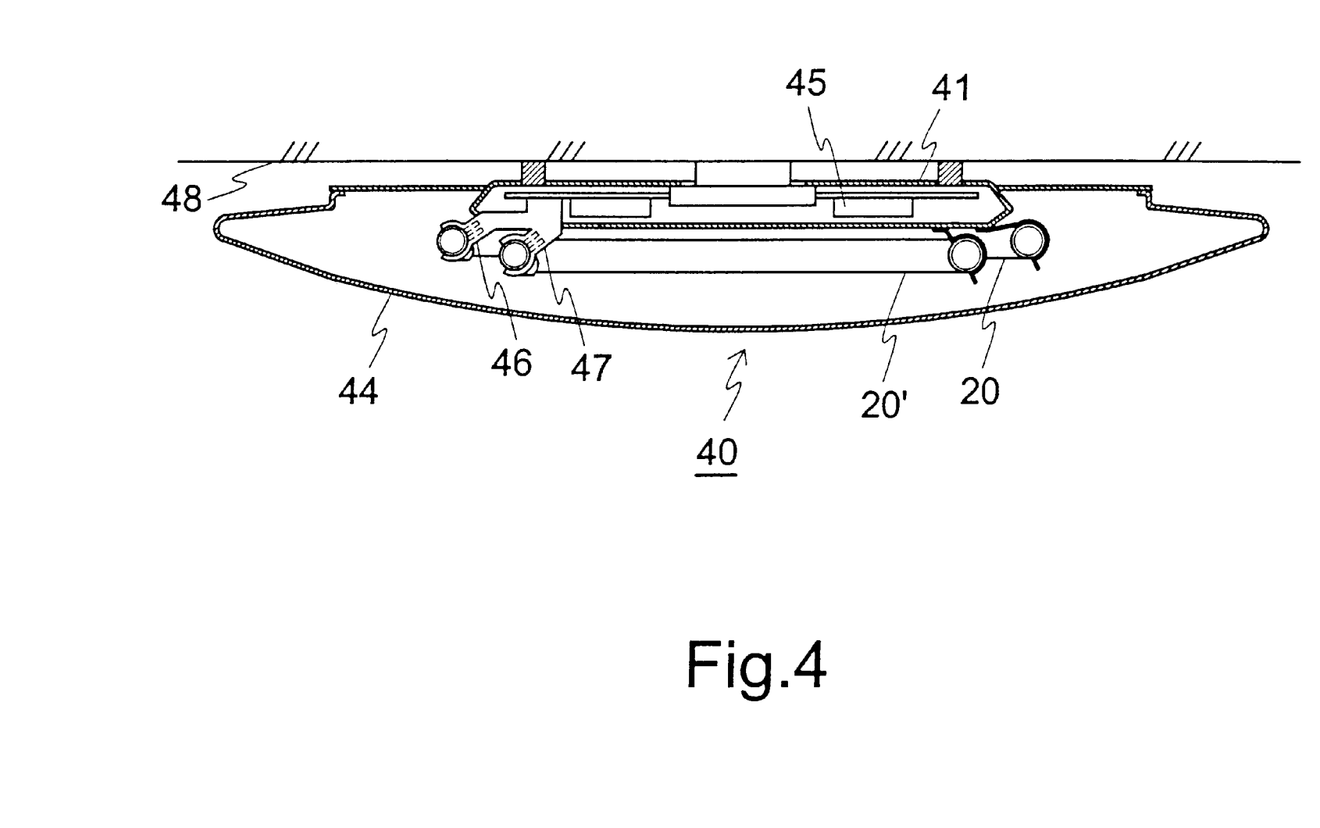
FIG. 4 is a section of a lighting fixture according to the present invention.

FIG. 4 shows a side view, partly in section, of a lighting fixture according to the present invention. The lighting fixture 40 is provided with a body 41 having lamp sockets 46, 47. Circular fluorescent lamps 20, 20' are respectively the 34 W and 27 W type of the second embodiment. A shade 44 covers the fluorescent lamps 20, 20'. An electrical ballast 45 supplies a high frequency voltage to the fluorescent lamps 20, 20'. Since each of the fluorescent lamps 20, 20' has improved luminous flux, the light output ratio from the lighting fixture also can be improved.

What is claimed is:

1. A fluorescent lamp comprising:
a light-transmitting glass tube having a softening temperature of about 685 degrees centigrade or less, not substantially including lead (Pb), and including:
sodium oxide ($Na_2O$) about 1 to about 11 weight %,
potassium oxide ($K_2O$) about 1 to about 10 weight %,
lithium oxide ($Li_2O$) 0 to about 3 weight %, wherein the total amount of sodium oxide ($Na_2O$), potassium oxide ($K_2O$), and lithium oxide ($Li_2O$) is about 5 to about 20 weight %, and
antimony oxide ($Sb_2O_3$) about 0.1 to about 0.5 weight %; and
a stem, having an electrode, arranged at each end of the light-transmitting glass tube,
wherein the lamp current density, which is the ratio of the lamp current to the cross-sectional area of the glass tube, is about 200 $mA/cm^2$ or more.

2. A fluorescent lamp comprising:
a light-transmitting glass tube having a softening temperature of about 685 degrees centigrade or less, not substantially including lead (Pb), and including a stem, having an electrode, arranged at each end of the light-transmitting glass tube, wherein the light-transmitting glass tube includes:
silicon oxide ($SiO_2$) about 60 to about 75 weight %,
aluminum oxide ($Al_2O_3$) about 1 to about 5 weight %,
sodium oxide ($Na_2O$) about 1 to about 11 weight %,
potassium oxide ($K_2O$) about 1 to about 10 weight %,
lithium oxide ($Li_2O$) 0 to about 3 weight %, wherein the total amount of sodium oxide ($Na_2O$), potassium oxide ($K_2O$), and lithium oxide ($Li_2O$) is about 5 to about 20 weight %,
calcium oxide (CaO) about 2 to about 5 weight %,
magnesium oxide (MgO) about 1 to about 3 weight %,
barium oxide (BaO) about 1 to about 10 weight %,
strontium oxide (SrO) about 0.5 to about 10 weight %, wherein the total amount of calcium oxide (CaO), magnesium oxide (MgO), barium oxide (BaO), and strontium oxide (SrO) is about 4.5 to about 17 weight %,
boron oxide ($B_2O_3$) 0 to about 3 weight %,
zinc oxide (ZnO) 0 to about 3 weight %,
antimony oxide ($Sb_2O_3$) about 0.1 to about 0.5 weight %, and
iron oxide ($Fe_2O_3$) about 0.01 to about 0.05 weight %.

3. A fluorescent lamp according to claims 1 or 2, wherein the glass tube is circular.

4. A fluorescent lamp according to claims 1 or 2, wherein the light-transmitting glass tube further comprises a sealed exhaust tube.

5. A fluorescent lamp according to claims 1 or 2, wherein the fluorescent lamp has plural light-transmitting glass tubes, and the ratio of the quantity of the mercury (Hg) to the internal volume enclosed by the glass tubes is in the range of about 0.003 $mg/cm^3$ to about 0.016 $mg/cm^3$.

6. A fluorescent lamp according to claims 1 or 2, wherein the light-transmitting glass tube includes:
silicon oxide ($SiO_2$) about 60 to about 75 weight %,
aluminum oxide ($Al_2O_3$) about 1 to about 5 weight %,
sodium oxide ($Na_2O$) about 1 to about 11 weight %,
potassium oxide ($K_2O$) about 1 to about 10 weight %,
lithium oxide ($Li_2O$) 0 to about 3 weight %, wherein the total amount of sodium oxide ($Na_2O$), potassium oxide ($K_2O$), and lithium oxide ($Li_2O$) is about 5 to about 20 weight %,
calcium oxide (CaO) 0 to about 3 weight %,
magnesium oxide (MgO) 0 to about 2 weight %,
barium oxide (BaO) about 1 to about 10 weight %,
strontium oxide (SrO) about 0.5 to about 10 weight %, wherein the total amount of calcium oxide (CaO), magnesium oxide (MgO), barium oxide (BaO), and strontium oxide (SrO) is about 4.5 to about 16 weight %,
boron oxide ($B_2O_3$) 0 to about 3 weight %,
zinc oxide (ZnO) 0 to about 3 weight %, and
antimony oxide ($Sb_2O_3$) about 0.1 to about 0.5 weight %.

7. A fluorescent lamp according to claims 1 or 2, wherein a phosphor layer comprises luminescent compounds, which generate a three-peak emission including a blue wavelength of about 430 nm to about 460 nm, a green wavelength of about 540 nm to about 550 nm, and a red wavelength of about 610 nm to about 620 nm.

8. A fluorescent lamp according to claims 1 or 2, wherein the glass composition of the stem is the same as that of the light-transmitting glass tube.

9. A method for manufacturing a fluorescent lamp comprising:
coating a luminescent compound on the inner surface of a straight glass tube; wherein the straight glass tube has a softening temperature of about 685 degrees centigrade or less, does not substantially include lead (Pb), and includes:
silicon oxide ($SiO_2$) about 60 to about 75 weight %,
aluminum oxide ($Al_2O_3$) about 1 to about 5 weight %,
sodium oxide ($Na_2O$) about 1 to about 11 weight %,
potassium oxide ($K_2O$) about 1 to about 10 weight %,
lithium oxide ($Li_2O$) 0 to about 3 weight %, wherein the total amount of sodium oxide ($Na_2O$), potassium oxide ($K_2O$), and lithium oxide ($Li_2O$) is about 5 to about 20 weight %,
calcium oxide (CaO) 0 to about 3 weight %,
magnesium oxide (MgO) 0 to about 2 weight %,
barium oxide (BaO) about 1 to about 10 weight %,
strontium oxide (SrO) about 0.5 to about 10 weight %, wherein the total amount of calcium oxide (CaO), magnesium oxide (MgO), barium oxide (BaO), and strontium oxide (SrO) is about 4.5 to about 16 weight %,
boron oxide ($B_2O_3$) 0 to about 3 weight %,
zinc oxide (ZnO) 0 to about 3 weight %, and
antimony oxide ($Sb_2O_3$) about 0.1 to about 0.5 weight %;
baking the coated layer on the straight glass tube at a predetermined temperature to form a phosphor layer;
sealing each end of the glass tube with a stem having an electrode;
bending the straight glass tube while heating the straight glass tube at the softening temperature of the glass or more;
exhausting the glass tube via an exhaust tube and introducing rare gas and mercury (Hg) into the glass tube; and
sealing the exhaust tube.

10. A lighting fixture comprising:
a fluorescent lamp comprising:
a light-transmitting glass tube having a softening temperature of about 685 degrees centigrade or less, not substantially including lead (Pb), and including:
sodium oxide ($Na_2O$) about 1 to about 11 weight %,
potassium oxide ($K_2O$) about 1 to about 10 weight %, lithium oxide (Li$_2$O) 0 to about 3 weight %, wherein the total amount of sodium oxide (Na$_2$O), potassium oxide (K$_2$O), and lithium oxide (Li$_2$O) is about 5 to about 20 weight %,
antimony oxide (Sb$_2$O$_3$) about 0.1 to about 0.5 weight %;
a stem, having an electrode, arranged at each end of the light-transmitting glass tube;
a body holding the fluorescent lamp; and
a ballast arranged on the body for supplying the electric power to the fluorescent lamp wherein the lamp current density, which is the ratio of the lamp current to the cross-sectional area of the glass tube, is about 200 mA/cm$^2$ or more.

* * * * *